United States Patent
Zhou et al.

(10) Patent No.: US 8,289,444 B2
(45) Date of Patent: Oct. 16, 2012

(54) SYSTEM AND METHOD FOR REDUCING VISIBLE HALO IN DIGITAL VIDEO WITH COVERING AND UNCOVERING DETECTION

(75) Inventors: Zhi Zhou, Irvine, CA (US); Yeong-taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 654 days.

(21) Appl. No.: 12/436,650

(22) Filed: May 6, 2009

(65) Prior Publication Data

US 2010/0283892 A1  Nov. 11, 2010

(51) Int. Cl.
*H04N 7/11* (2006.01)
*H04N 11/20* (2006.01)

(52) U.S. Cl. ........ 348/441; 348/452; 348/453; 348/456; 348/700; 348/701; 348/620; 382/300

(58) Field of Classification Search .................. 348/441, 348/452, 453, 456, 700, 701, 620; 382/300
See application file for complete search history.

(56) References Cited

U.S. PATENT DOCUMENTS

| | | | |
|---|---|---|---|
| 6,480,632 B2* | 11/2002 | Martins et al. | 382/300 |
| 6,539,055 B1* | 3/2003 | Hazra | 375/240.16 |
| 7,542,095 B2* | 6/2009 | Zhou et al. | 348/452 |
| 7,825,968 B2* | 11/2010 | Azuma et al. | 348/262 |
| 7,903,156 B2* | 3/2011 | Nobori et al. | 348/272 |
| 8,009,923 B2* | 8/2011 | Li et al. | 382/236 |
| 8,144,778 B2* | 3/2012 | Jia et al. | 375/240.16 |
| 8,170,370 B2* | 5/2012 | Hung | 382/284 |
| 2005/0265610 A1* | 12/2005 | Natarajan et al. | 382/235 |
| 2007/0183505 A1* | 8/2007 | Shimizu et al. | 375/240.16 |
| 2007/0230830 A1* | 10/2007 | Ohwaki et al. | 382/300 |
| 2008/0069221 A1* | 3/2008 | Ohwaki et al. | 375/240.16 |
| 2008/0159390 A1* | 7/2008 | Lu | 375/240.16 |
| 2009/0147132 A1* | 6/2009 | Sato et al. | 348/451 |

* cited by examiner

*Primary Examiner* — Jefferey Harold
*Assistant Examiner* — Mustafizur Rahman

(57) ABSTRACT

A system and method for video frame interpolation are disclosed. In one embodiment, the method comprises receiving first motion estimation data representing estimated motion of blocks between a first frame and a second frame, receiving second motion estimation data representing estimated motion of blocks between the second frame and a third frame, determining whether an area in an interpolated frame between the first and second frame is an occlusion area based at least in part on the first and second motion estimation data, and estimating characteristics of pixels of the area based in part on the determination.

15 Claims, 7 Drawing Sheets

SYSTEM AND METHOD FOR REDUCING VISIBLE HALO IN DIGITAL VIDEO WITH COVERING AND UNCOVERING DETECTION

BACKGROUND

1. Field

The disclosure is related to video processing. More particularly, the disclosure is related to interpolation techniques for frame rate conversion and motion judder cancellation.

2. Description of the Related Technology

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly directed to the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprising fields of alternating odd or even lines of a picture). Multimedia processors, such as video encoders, may encode a frame by partitioning it into blocks or "macroblocks" of, for example, 16×16 pixels. The encoder may further partition each macroblock into sub-blocks. Each subblock may further comprise additional sub-blocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock, or even a single pixel.

Video sequences may be received by a receiving device in a compressed format and subsequently be decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate and/or pixel resolution. To accommodate this, video reconstruction of one or more video frames may be performed. Reconstruction of video frames may comprise estimating a video frame between two or more already received (or received and decompressed) video frames. The reconstruction may involve techniques known as motion estimation and motion compensation. Matching portions of video frames between two or more already received (or received and decompressed) frames are identified along with a motion vector that contains the relative locations of the matching blocks in the process of motion estimation. These matching blocks and motion vectors are then used to reconstruct portions of the intermediate frame by the process of motion compensation. Frame rate conversion, de-interlacing, and transcoding are examples of processes where decoder devices create new video data based on already available video data. In addition, these motion compensation techniques can use encoded data, such as motion vectors and residual error, as well as the reconstructed video data for estimating the newly created frames.

Occlusions occurring in a video sequence can present a problem to a motion estimation/compensation algorithm. Occlusions include, for example, the covering of one object (background is considered as an object) by another, and the uncovering of one object due to motion of another. Typically, the motion vectors estimated in the vicinity of occlusion areas are incorrect and using these motion vectors directly for motion compensation causes visual artifacts. Visual artifacts include visible errors introduced by the decoding process such as a "halo" effect. One of the important steps in reducing the introduction of visual artifacts is the identification of occlusion areas in a video frame and subsequent classification of them into covering and uncovering areas. Many approaches that have been suggested for the solution of this problem suffer from one or more drawbacks including high computational complexity, poor accuracy and localization, and insensitivity to the actual desired interpolation phase between two frames.

SUMMARY OF CERTAIN INVENTIVE ASPECTS

The systems and methods of the development each have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description of Certain Inventive Embodiments" one will understand how the sample features of this development provide advantages that include more robust and efficient reformatting of video sequences in regions including occlusions so as to reduce visible halo artifacts.

One aspect of the development includes a method of video frame interpolation comprising receiving first motion estimation data representing estimated motion of blocks between a first frame and a second frame, receiving second motion estimation data representing estimated motion of blocks between the second frame and a third frame, determining whether an area in an interpolated frame between the first and second frame is an occlusion area based at least in part on the first and second motion estimation data, and estimating characteristics of pixels of the area based in part on the determination.

Another aspect of the development includes a method of video frame interpolation comprising receiving a video sequence comprising at least a first frame, a second frame, a third frame, and a fourth frame, receiving first motion estimation data representing estimated motion between the second frame and the first frame, receiving second motion estimation data representing estimated motion between the third frame and the second frame, receiving third motion estimation data representing estimated motion between the second frame and the third frame, receiving fourth motion estimation data representing estimated motion between the third frame and the fourth frame, determining whether an area in an interpolated frame between the second frame and third frame is a covering area, determining whether the area in an interpolated frame between the second frame and third frame is an uncovering area, and estimating characteristics of pixels of the area based in part on at least one of the determinations and at least one of the second or third frame.

Another aspect of the development includes a video frame interpolation system comprising an input configured to receive first motion estimation data representing estimated motion of blocks between a first frame and a second frame and to receive second motion estimation data representing estimated motion of between the second frame and the third frame, a occlusion determination module configured to determine whether an area in an interpolated frame between the first and second frame is an occlusion area based at least in part on the first and second motion estimation data, and a pixel characteristic estimation module configured to estimate characteristics of pixels of the area based in part on the determination.

Another aspect of the development includes a video frame interpolation system comprising an input configured to receive a video sequence from a computer-readable medium or over a network connection, the video sequence comprising at least a first frame, a second frame, a third frame, and a fourth frame, a processor configured to generate, to receive from a computer-readable medium, or to receive over a network connection first motion estimation data representing estimated motion between the second frame and the first frame, second motion estimation data representing estimated motion between the third frame and the second frame, third motion estimation data representing estimated motion between the second frame and the third frame, and fourth motion estimation data representing estimated motion between the third frame and the fourth frame, wherein the processor is further configured to determine whether an area in an interpolated frame between the second frame and third frame is a covering area, and uncovering, or neither, wherein the processor is further configured to estimate characteristics of pixels of the area based in part on at least one of the determinations and at least one of the second or third frame.

Yet another aspect of the development includes a video frame interpolation system comprising means for receiving first motion estimation data representing estimated motion of blocks between a first frame and a second frame, means for receiving second motion estimation data representing estimated motion of blocks between the second frame and a third frame, means for determining whether an area in an interpolated frame between the first and second frame is an occlusion area based at least in part on the first and second motion estimation data, and means for estimating characteristics of pixels of the area based in part on the determination.

Yet another aspect of the development includes a programmable storage device comprising code which, when executed, causes a processor to perform a method of video frame interpolation comprising receiving first motion estimation data representing estimated motion of blocks between a first frame and a second frame, receiving second motion estimation data representing estimated motion of blocks between the second frame and a third frame, determining whether an area in an interpolated frame between the first and second frame is an occlusion area based at least in part on the first and second motion estimation data, and estimating characteristics of pixels of the area based in part on the determination.

DETAILED DESCRIPTION OF CERTAIN INVENTIVE EMBODIMENTS

The following detailed description is directed to certain specific sample aspects of the development. However, the development can be embodied in a multitude of different ways as defined and covered by the claims. In this description, reference is made to the drawings wherein like parts are designated with like numerals throughout.

Figure 1:
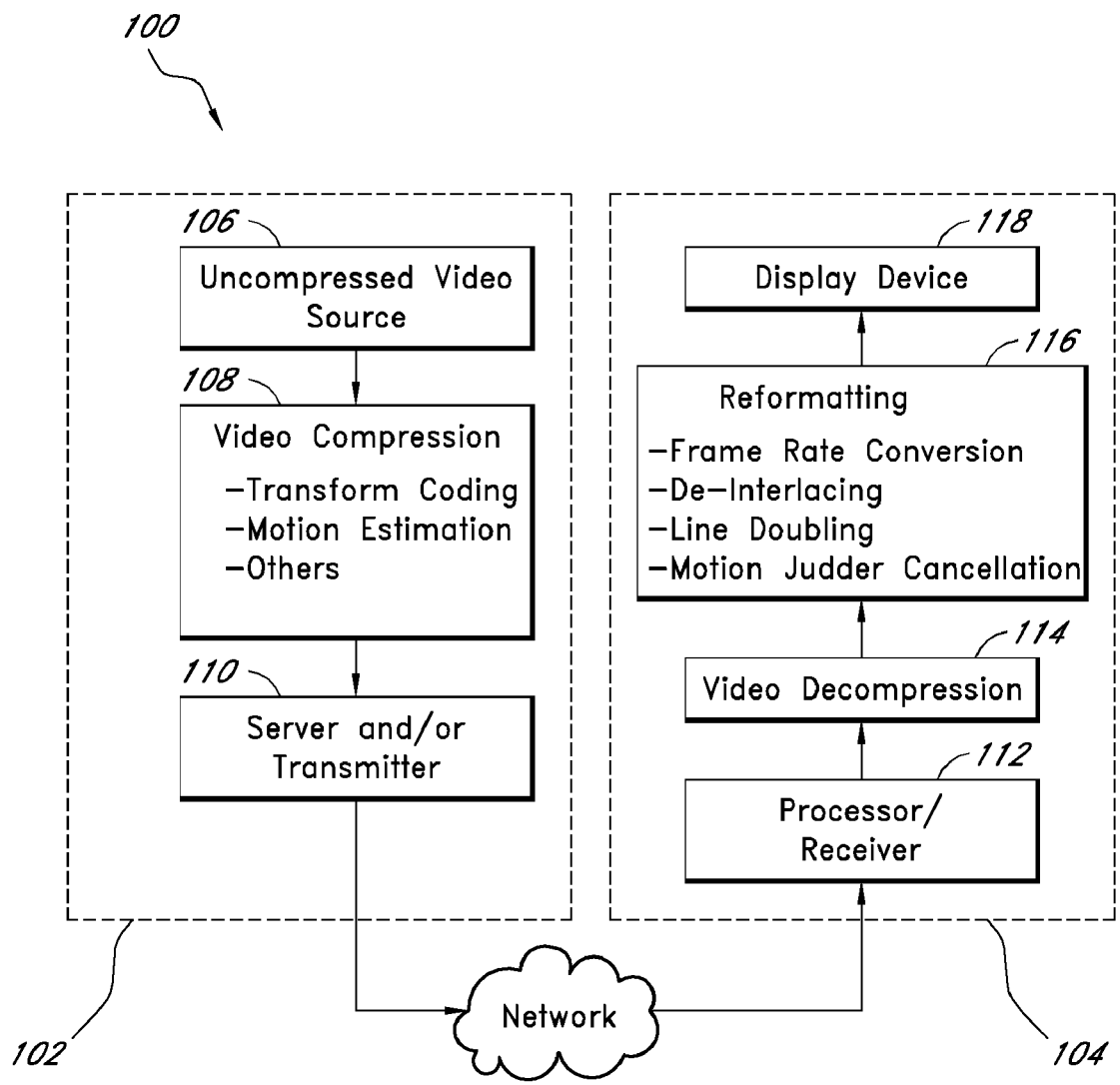
FIG. 1 is a functional block diagram of an exemplary communication system for encoding and decoding of digital video data, according to one embodiment of the system and method.

FIG. 1 illustrates a functional block diagram of an exemplary communication system 100. The system 100 includes a video source 102 and video reception device 104. In this embodiment, the video source 102 obtains raw (uncompressed) video from an uncompressed video source 106, compresses it with a video compression element 108 and stores or communicates the compressed video data using a communication element 110. The video reception device 104 includes a processor and/or receiver 112 which receives and/or processes video data, a video decompression element 114 which decompresses video data which is received in a compressed format, and a reformatting subsystem 116 which transcodes data from one format to another. The reformatted video data can be displayed on a display device 118. The compressed video can be communicated from the video source 102 to the video reception device 104 via a network 101.

The uncompressed video source 106 can be a video camera, or a memory device such as a disk drive. The uncompressed video source 106 provides uncompressed video data in the form of luminance and chrominance, or in individual color intensities such as red, green and blue, etc.

The video compression element 108 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 108.

The communication element 110 may be a server that is connected to the Internet and stores the compressed video. The communication element 110 may also be a transmitter that is configured to transmit the compressed video over the network 101. The network 101 may comprise one or more of a wired or wireless communication system, including one or more of, for example, an Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a DMB (Digital Multimedia Broadcasting) system, an orthogonal frequency division multiple access (OFDM) system, or a DVB-H (Digital Video Broadcasting—Handheld) system.

The processor/receiver 112 of the video reception device 104 receives the compressed video over the network 101. In another embodiment, the processor/receiver accesses the compressed video from a memory storage device such as a DVD, a hard drive, a memory card, etc. The processor/receiver 112 can be included in a personal computer, a set top box, a handheld device, etc.

The video decompression element 114 decodes (e.g., decompresses) the received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 can be part of the same device that contains the processor/receiver 112, or it can be a separate device. The video reception device 104 can be part of a set-top box, a DVD player, a PC, etc. In some embodiments, the video reception device 104 may receive uncompressed video (e.g., from the uncompressed video source 106). In these embodiments, the video decompression element 114 may be omitted.

The format of the reconstructed video output from the video decompression element 114 depends on the format that was encoded by the video encoder. For example, digital video formats can include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. The reformatting subsystem 116 modifies the video signal to a format that fits the format of a display device 118 that is connected to the video reception device 104. The display device may be a television set (e.g., NTSC, PAL or HDTV), or a computer monitor running at frame rates such as 70 Hz, 75 Hz, 80 Hz, etc. The reformatting subsystem 116 may be part of the same device as the video decompression element 114 and/or the processor receiver 112. In some embodiments as discussed above, the video received by the video reception device 104 may be uncompressed video (e.g., from the uncompressed video source 106) and the video decompression element 114 is omitted. In these embodiments, the reformatting subsystem 116 reformats the uncompressed video.

The processes performed by the reformatting subsystem 116 can be very similar to the encoding schemes used to encode the compressed video data. Motion estimation/compensation can be used to create intermediate frames between reconstructed frames in order to enable frame rate conversion. Therefore, methods of spatial prediction and temporal prediction used in encoder devices can also be used in decoder devices for purposes of reformatting the video. The reformatting subsystem 116 can use reconstructed video data and/or compressed video data (e.g., motion vectors, residual error values, etc.) for performing the reformatting.

Figure 2:
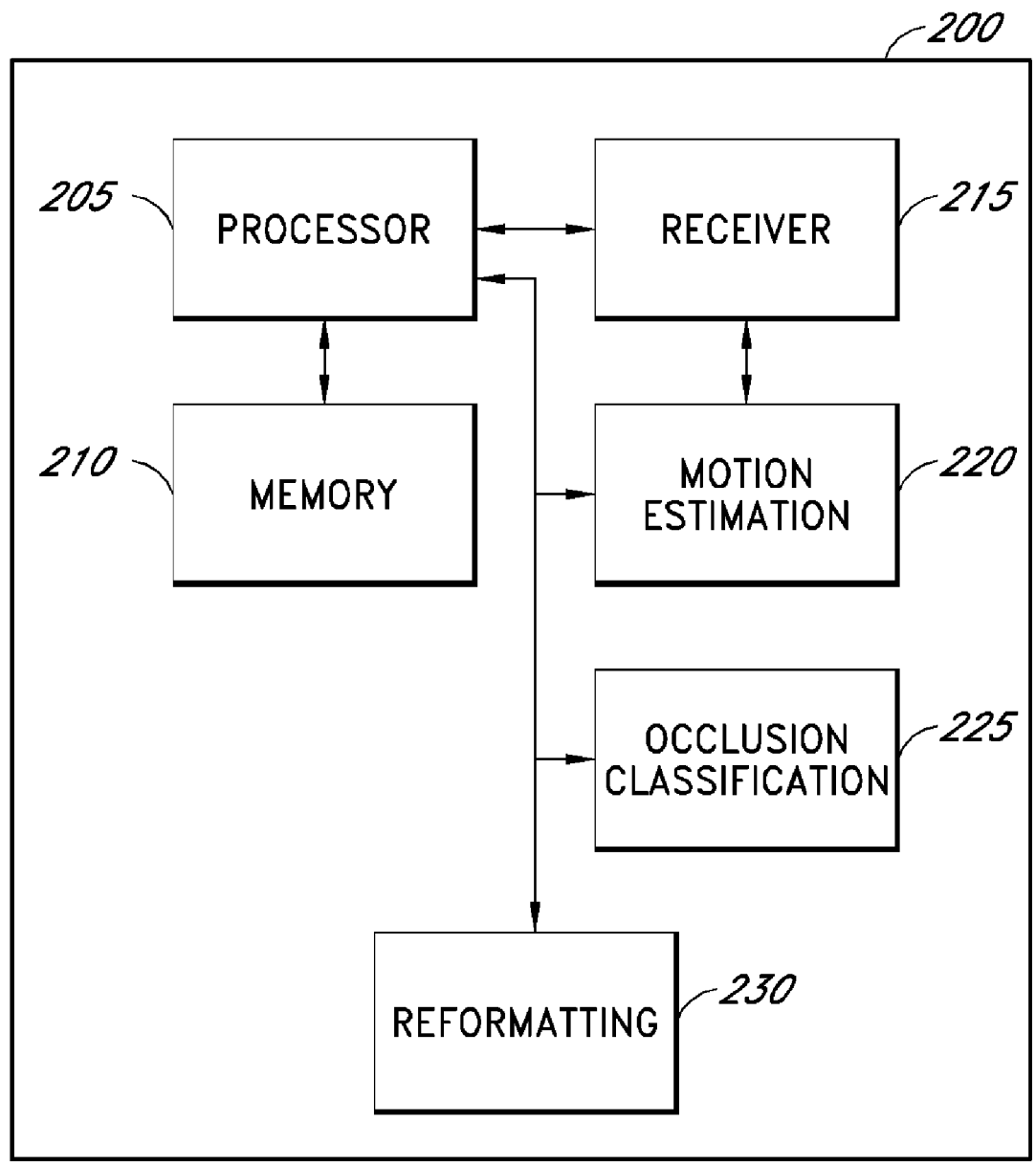
FIG. 2 is a block diagram illustrating an embodiment of a video reception system that may be used for the video reception device in a communication system such as illustrated in FIG. 1.

FIG. 2 is a block diagram illustrating an embodiment of a video reception system 200 that may be used for the video reception device 104 in a communication system such as illustrated in FIG. 1. In this embodiment, the video reception system 200 comprises a processor element 205, a memory element 210, an optional receiver element 215, a motion estimation subsystem 220, an occlusion classification subsystem 225, and a reformatting subsystem 230. The processor 205 may include one or more of a general purpose processor and/or a digital signal processor and/or an application specific hardware processor. The memory 210 may include, for example, one or more of integrated circuits or disk based storage or any readable and writeable random access memory device. The processor 205 is coupled to the memory 210 and the other elements to perform the various actions of the other elements. In some embodiments, the receiver 215 receives video data over the network 101. In other embodiments, the other elements (e.g., the motion estimation subsystem 220) may receive the video data directly from the memory element 210 or one or more external memory devices including memory discs, memory cards, internet server memory, etc. The video data received over the network 101, from the memory element 210 or from external memory devices may be compressed or uncompressed video data. In the case of compressed video data stored in the memory element 210 or in the external memory devices, the compressed video data may have been created at an earlier time by an encoding device such as the video source 102 in FIG. 1.

The motion estimation subsystem 220 identifies portions of video that exhibit temporal redundancy from between two or more frames of video sequences as discussed above. The identified portions of video data containing temporal redundancy can be used to reconstruct new frames of video, such as done in frame rate conversion or de-interlacing. The portions of reference frames identified by the motion estimation subsystem 220 may be used by the reformatting subsystem 230, along with motion estimation data such as motion vectors either obtained from the encoded/compressed data or determined by the motion estimation subsystem 220, to construct other frames or portions of video data in reference to the reference frames. In one embodiment, a motion vector is used to locate a portion of an already reconstructed reference frame that is used to construct the portion of the other frame. In one aspect, a matching block of pixels in a first frame is identified by the motion estimation subsystem 220 for each block in a second frame. A residual error measurement such as a sum of absolute differences (SAD) or a mean square error (MSE) may be used to identify a matching reference portion or portions that may be used to construct other video frames using the reformatting subsystem 230. Details of actions performed by the motion estimation subsystem 220 will be discussed below with reference to FIG. 3.

The occlusion classification subsystem 225 uses the motion estimation data to classify the block to be constructed according to a type of occlusion. The type of occlusion that the block is classified as having may include covering, uncovering, or normal classifications. In one aspect, by using the size of the overlap areas of several blocks belonging to a neighborhood of blocks in the reference frame with the block to be constructed, the occlusion classification subsystem 225 can determine whether the block is covering, uncovering, or normal (neither covering or uncovering). In another aspect, the position of the blocks in one of the reference frames can also be used in the covering/uncovering determination. In another aspect, the occlusion classification subsystem 225 can use the motion estimation data between three or more frames to determine whether a block is covering, uncovering, or normal. Details of the actions performed by the occlusion classification subsystem 225 will be discussed below in reference to the methods illustrated in FIG. 5.

The reformatting subsystem 230 is used to reformat the reconstructed video data in order to display it on a video display device with certain video format requirements, e.g., frame rate, numbers of pixels per row and/or column, etc. The reformatting subsystem 230 can perform functions as discussed above in reference to the reformatting subsystem 116 of the video receiver 104. In one embodiment, the reformatting subsystem 230 creates one or more new frames between the reconstructed frames in order to match a frame rate of the display device. In one aspect, motion compensation techniques, similar to those discussed above, may be used to create the intermediate frames of frame rate conversion.

The reformatting subsystem 230 uses the type of occlusion classifications as determined by the occlusion classification subsystem 225 to affect which portions of reference data are used for the reconstruction of portions of video data. For example, if an area of a video data to be constructed is determined to be covering from a previous frame to a subsequent frame, then the information may be missing (covered) in the subsequent frame and, therefore, only the video data from the previous frame is used to reconstruct the covering classified portion. Likewise, if an area of a video data to be constructed is determined to be uncovering from a previous frame to a subsequent frame, then the information may be missing (covered) in the previous frame and, therefore, only the video data from the subsequent frame is used to reconstruct the uncovering classified portion. An area of a video that is classified as normal can be constructed using data from both the previous frame and the subsequent frame. Details of actions performed by the reformatting subsystem 230 will be discussed below in reference to the methods illustrated in FIG. 5.

In some embodiments, one or more of the elements of the video reception system 200 of FIG. 2 may be rearranged and/or combined. The elements may be implemented by hardware, software, firmware, middleware, microcode or any combination thereof. Details of the actions performed by the elements of the video reception system 200 will be discussed in reference to the methods illustrated in FIG. 5 below.

Figure 3:
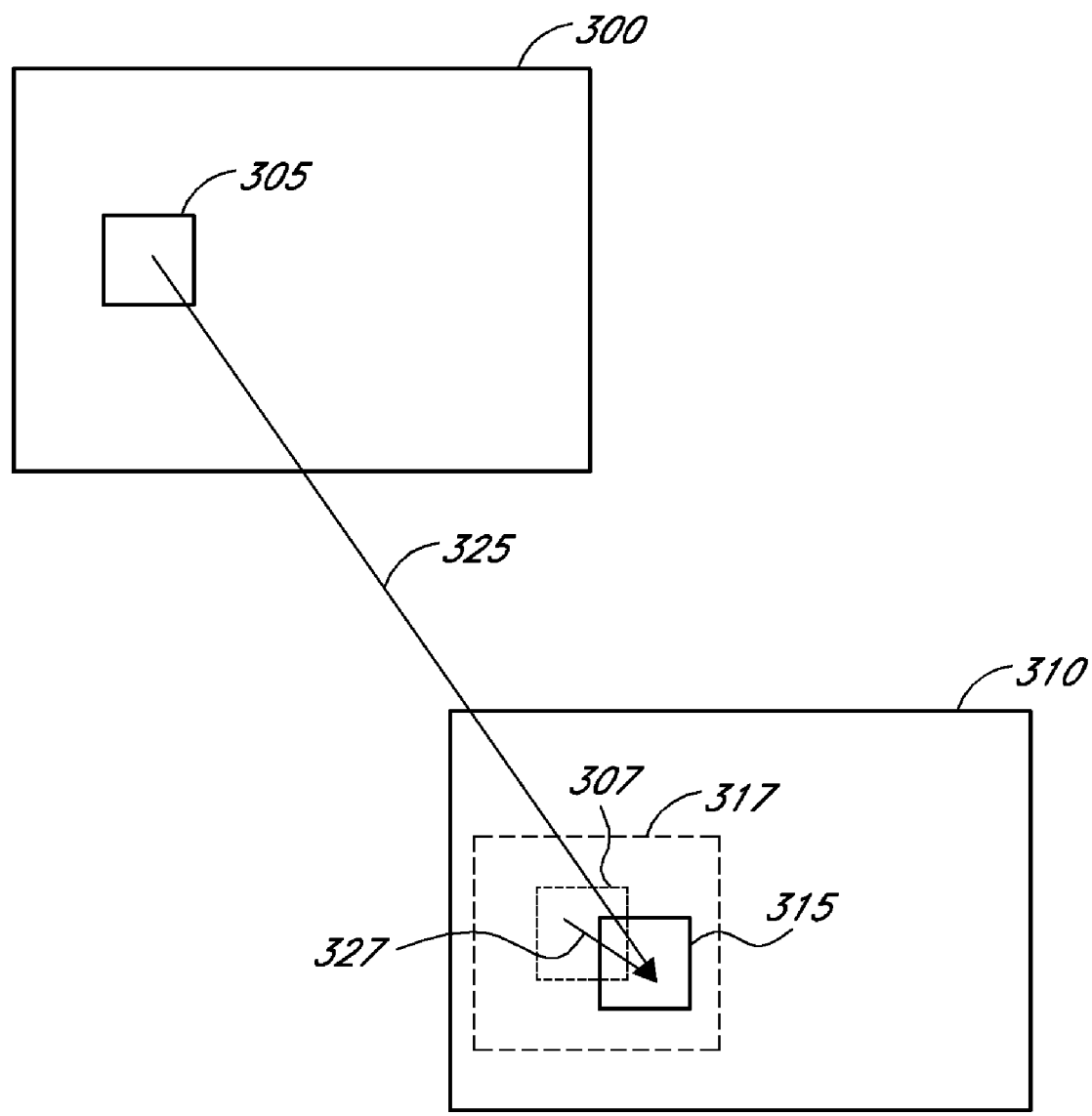
FIG. 3 is an illustration of an example of block matching that may be used to generate motion estimation data.

FIG. 3 is an illustration of an example of block matching that may be used to generate motion estimation data. For each block 305 in a first video frame 300, a best matching block 315 within a search area 317 in a second video frame 310 is determined. The search area 317 can be selected as centered about a collocated block 307 in the second video frame 310. Alternatively, the search area can be selected as centered about a different block based on previously received motion estimation data. A motion vector 325 can be defined which indicates the position of the matching block 315 relative to the block 305 under consideration. In another embodiment, an intraframe motion vector 327 can be defined as the projection of the interframe motion vector 325 onto the first frame 300 or the second frame 310. The search area 320 may be a predetermined neighborhood surrounding the block 307 in frame 300 that is collocated (in the same vertical and horizontal location in a frame) with the block 305 of frame 300. The predetermined search area may be of any size ranging from the size of the block up to the entire frame. For blocks on the edges or corners of frames, block padding or any other boundary condition may be used. The search area may also be adaptive. A residual error measurement such as a sum of absolute differences (SAD) or a mean square error (MSE) may be used to identify a matching block. The block with the best error measurement is determined to be the matching block. Such a block matching technique can generate motion estimation data for each block in the entire frame 300. The motion estimation subsystem 220 of the video reception system 200 in FIG. 2 can perform the motion estimation or motion vector generation.

The first video frame 300 and second video frame 310 can be video frames of a video sequence, in which a plurality of frames are ordered. If the first video frame 300 is prior to the second video frame 310, forward motion estimation can be performed or forward motion vectors can be generated. If the first video frame is subsequent to the second video frame 310, backwards motion estimation can be performed or backwards motion vectors can be generated.

The motion estimation data generated can also include residual error measurements, pixel error variance, and rotational information. The motion information may also include more degrees of freedom other than just linear translation.

Figure 4:
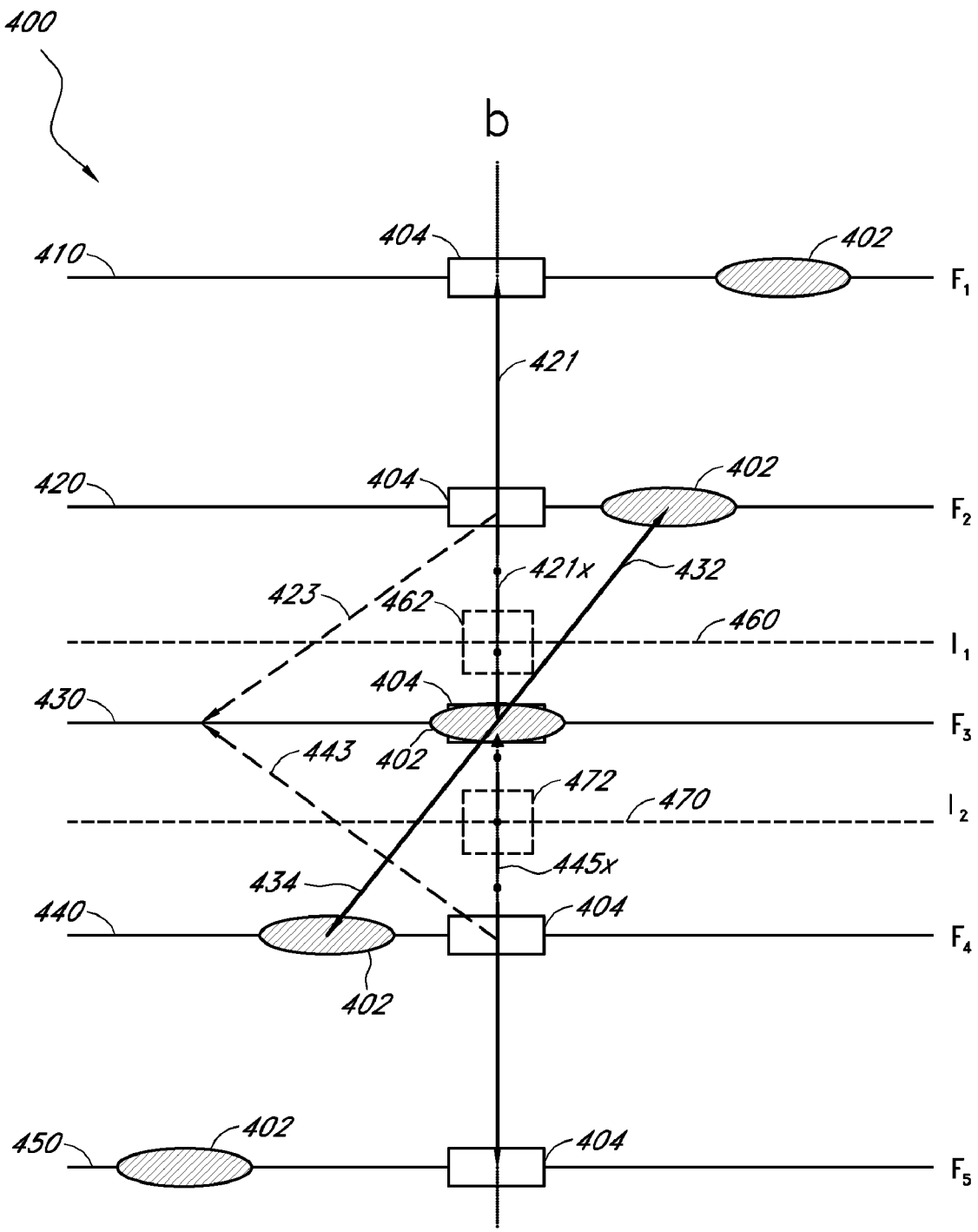
FIG. 4 is a diagram of an exemplary sequence of frames illustrating a covering and an uncovering.

FIG. 4 is a diagram of an exemplary sequence of frames 400 illustrating a covering and an uncovering. The sequence of frames 400 includes a first frame 410 illustrating a foreground object 402 having an elliptical shape and a background object 404 having a rectangular shape. As the sequence of frames 400 progresses, the foreground object 402 moves in front of the background object 404, covering it, at the third frame 430. The foreground object moves past the background object 404, uncovering it, at the fourth frame 440. Throughout the sequence of frames 400, the background object 404 remains stationary. In other sequences both objects can be moving.

A motion vector 421 between the second frame and first frame is defined at position b. As the background object 404 does not move throughout the sequence 400, it is not surprising that the motion vector 421 indicates the block in the first frame 410 which best matches the block in the second frame 420 at position b is the collocated block in the first frame 410 at position b. A motion vector 432 is also defined at position b between the third frame 430 and the second frame 420. The motion vector indicates that the block in the second frame 420 that best matches the block at position b in the third frame 430 is a block located within the foreground object 402. A motion vector 434 is similarly defined at position b between the third frame 430 and the fourth frame 440. The motion vector indicates that the block in the fourth frame 440 that best matches the block at position b in the third frame 430 is a block located within the foreground object 402. Another motion vector 445 is defined at position b between the fourth frame 440 and the fifth frame 450.

Two motion vectors 423, 443 are shown between the second and third frame and the fourth and third frame. As the background object 404 is occluded by the foreground object 402 in the third frame 430, there is no block in the third frame which matches well with the blocks at position b in the second and fourth frames. In some embodiments, the motion estimation system 220 fails to generate a motion vector in cases where the "best match" isn't good enough. For example, if the lowest mean-squared error is above a threshold, a motion vector may not be generated. In another embodiment, a motion vector may not be generated when a resultant residual error measurement would be greater than a predetermined threshold. In other embodiments, the motion estimation system 220 generates a motion vector with the best match regardless of the quality of the match. In such cases, the location of best matching block can be random and unrelated to the location of the background object 404.

In generating a first interpolated frame 460 containing a covering area 462 or a second interpolated frame 470 containing an uncovering area 472, poor results would be obtained from using the motion vectors 423, 443 which do not correlate to the background object 404. A method of avoiding this problem is discussed with respect to FIG. 5.

Figure 5:
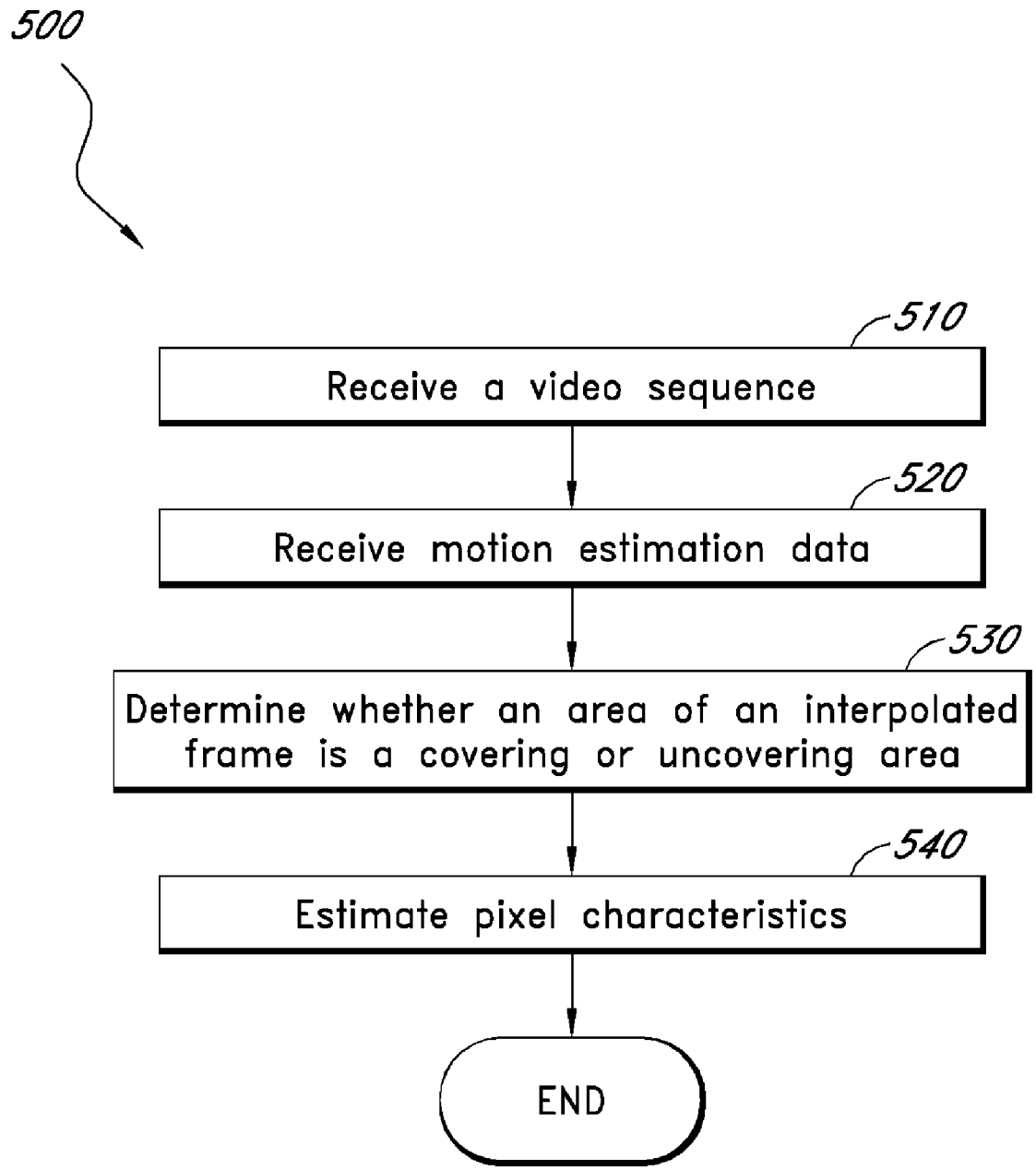
FIG. 5 is flowchart illustrating a method of interpolating a frame.

FIG. 5 is flowchart illustrating a method of interpolating a frame. The process 500 begins, at block 510, with the reception of a video sequence comprising of a number of frames. The video sequence can be received by video reception device 104 of FIG. 1 over a network or from a computer-readable medium. The video sequence can be received in a compressed format and subsequently decompressed.

Next, in block 520, motion estimation data is received. The motion estimation data can also be received by the video reception device 104 of FIG. 1, either from a computer-readable medium or over a network. The motion estimation data can be received from the video source 102 over the network 101 of FIG. 1. The motion estimation data can be received with the video sequence received in block 510. The motion estimation data can also be received separately from the video sequence. In one embodiment, the video sequence and motion estimation data are both received by the processor/receiver 112 of FIG. 1. In another embodiment, the video sequence is received by the processor 205 of FIG. 2 via the receiver 215, whereas the motion estimation data is received by the processor 205 from the motion estimation subsystem 220. The motion estimation data can take a number of forms including motion vectors which indicate the relative motion of a block between two frames of the video sequence. The motion estimation data can include forward motion estimation data, indicative of the relative motion of objects between a first frame and a second frame subsequent to the first frame. The motion estimation data can also include backward motion estimation data, indicative of the relative motion of objects between a first frame and a second frame preceding the first frame.

The process 500 continues, in block 530, with the determination of whether an area of an interpolated frame is a covering or uncovering area. The determination can be performed by the reformatting subsystem 116 of FIG. 1 or the occlusion classification subsystem 225 of FIG. 2. The determination can be performed in a number of ways. As described above with respect to FIG. 4, when an object is covered from a first frame to a second frame, the forward motion vector between the two frames generally has a high residual error. Similarly, when an object is uncovered from a first frame to a second frame, the backwards motion vector between the two frames generally has a high residual error. Thus, the residual error in the motion estimation data can be used to determine whether an area of an interpolated frame between two frames is a covering or uncovering area. For example, with respect to FIG. 4, the area 462 of the first interpolated frame 462 could be determined to be a covering area based on the high residual error of the forward motion vector 423 between the second frame 420 and third frame 430. Similarly, the area 472 of the second interpolated frame 470 could be determined to be an uncovering area based on the high residual error of the backwards motion vector 443 between the fourth frame 440 and third frame 430.

Another method of determining whether an area of an interpolated frame is a covering or uncovering area is described with respect to FIG. 4. The method is based on the number of motion vectors passing through the area of the interpolated frame. Methods of determining whether or not a particular motion vector passes through an area of an interpolated frame are discussed in more detail below. In determining whether area 462 of the first interpolated frame 460 is a covering area, the backwards motion vectors between the third frame 430 and the second frame 420 which pass through the area 462 are counted. Motion vector 432 is a backwards motion vector between the third frame 430 and the second frame 420; however, it does not pass through the area 462. This first count, denoted $C_1$, is, in the illustrated case, zero. Next, the backwards motion vectors between the second frame 420 and the first frame 410 are reversed and the reversed motion vectors passing through the area 462 are counted. Motion vector 421 is a backwards motion vector between the second frame 420 and the first frame 410. Reversed, the motion vector 421x would pass through the area 462 of the first interpolated frame. Thus, this second count, denoted $C_2$, is, in the illustrated case, one.

A decision for both covering and uncovering can be made from $C_1$ and $C_2$ In one embodiment, if $C_1$ is zero and $C_2$ is one, it can be determined that the area of an interpolated frame is a covering area. In other embodiments, it is determined that the area of an interpolated frame is a covering area if $C_1$ is zero and $C_2$ is non-zero. In other embodiments, it is determined that the area of an interpolated frame is a covering area if $C_1$ is smaller than $C_2$.

The above method of determining if an area of an interpolated frame is a covering area is now applied to block 472 of the second interpolated frame 470. In this case, $C_1$, the number of backwards motion vectors passing through the area 472 is zero. In this case, $C_2$, the number of reversed backwards motions passing through the area 472 is also zero. The backwards motion vector 432 between the third frame 430 and second frame 420, when reversed, would substantially align with motion vector 434 which does not pass through the area. Thus, it can be determined that area 472 of the second interpolated frame 470 is not a covering area.

The number of motion vectors passing through the area of the interpolated frame can also determine whether the area is an uncovering area. This method is also described with respect to FIG. 4. In determining whether area 472 is an uncovering area, the number of forward motion vectors between the third frame 430 and the fourth frame 440 which pass through the area 472 are counted. Motion vector 434 is a forward motion vector between the third frame 430 and the fourth frame 440; however, it does not pass through the area 472. This third count, denoted $C_3$, is, in the illustrated case, zero. Next, the forward motion vectors between the fourth frame 440 and fifth frame 450 are reversed and the reversed motion vectors passing through the area 472 are counted. Motion vector 445 is a forward motion vector between the fourth frame 440 and the fifth frame 450. Reversed, the motion vector 445x would pass through the area 472 of the second interpolated frame. This fourth count, denoted $C_4$, is, in the illustrated case, one.

If $C_3$ is zero and $C_4$ is one, it can be determined that the area of an interpolated frame is an uncovering area. In other embodiments, it is determined that the area of an interpolated frame is an uncovering area if $C_3$ is zero and $C_4$ is non-zero. In other embodiments, it is determined that the area of an interpolated frame is an uncovering area if $C_3$ is smaller than $C_4$.

The above method of determining if an area of an interpolated frame is an uncovering area is now applied to block 460 of the first interpolated frame. In this case, $C_3$, the number of forward motion vectors passing through the area 462 is zero. In this case, $C_4$, the number of reversed forward motion vectors passing through the area 462, is also zero. The forward motion vector between the third frame 430 and the fourth frame 440, when reversed, would substantially align with motion vector 432, which does not pass through the area 462. Thus, it can be determined that area 462 of the first interpolated frame 462 is not an uncovering area.

Determining whether a motion vector passes through an area of an interpolated frame can be accomplished in a number of ways. As described above, a motion vector can indicate the relative locations of matching blocks in the process of motion estimation. In one embodiment, the matching block is projected from a first frame onto the interpolated frame in accordance with the motion vector from the first frame to a second frame. If the area of the projected block which overlaps with the area of the interpolated frame is greater than a threshold, it can be determined that the motion vector passes through the area of the interpolated frame.

In one embodiment, if similar motion vectors are determined to pass through the same area of the interpolated frame, only one of the motion vectors are counted. For example, if the motion vectors are parallel and originate from neighboring blocks of the first frame, they can be considered similar. As another example, if the motion vectors are substantially parallel, such that an angle defined by both vectors is below a threshold, they can be considered similar.

In another embodiment, a motion vector is determined to pass through an area of an interpolated frame if the motion vector, as projected onto the interpolated frame, intersects the area. In another embodiment, a motion vector is determined to pass through an area of an interpolated frame if the motion vector, as projected onto the interpolated frame, intersects a region defined by the area. The region can be a similarly-shaped region collocated with the area, but of a larger or smaller size. The region can be a pre-defined shape of a pre-defined size collocated with the area.

The process 500 illustrated in FIG. 5 finishes, in block 540, by estimating characteristics of pixels within the interpolated area. The estimation can be performed by the reformatting subsystem 116 of FIG. 1 or the reformatting subsystem 230 of FIG. 2.

The pixel characteristics to be estimated can include hue, saturation, intensity, a red color value, a green color value, a blue color value, a grayscale value, or any other pixel characteristic recognized by those of ordinary skill in the art.

The pixel characteristics can be estimated based on the determination made in block 530 of whether the area in which the pixel belongs is a covering or uncovering area. In some embodiments, the pixel characteristics can be estimated based on the pixel characteristics of pixels in prior or later frames.

In one embodiment, a pixel whose characteristics are to be estimated is associated with a corresponding pixel from the previous frame and a corresponding pixel from the next frame based on the motion estimation data and the determination of whether the area in which the pixel belongs is a covering or uncovering area. The pixel characteristics can be estimated by a weighted average of multiple pixels, including the corresponding pixels of the previous frame or next frame. In one embodiment, larger weight will be assigned to the corresponding pixels.

If the pixel is in a covering area, such as area 462 of the first interpolated frame 460 in FIG. 4, the pixel is associated with a corresponding pixel from the previous frame 420 based on the reversed backwards motion vector 421x passing through the area 462. The corresponding pixel with which the pixel is associated is selected by tracing the reversed backwards motion vector 421x passing through the area 462 to its source and selecting a corresponding pixel from that location. For example, a pixel at position b of the first interpolated frame 460 would be associated with the pixel at position b of the second frame 420 based on the reversed backwards motion vector 421x. A pixel at a position 2 units to the left of b of the first interpolated frame 460 would be associated with the pixel at a position 2 units to the left of b of the second frame 420. The pixel characteristics of the pixel of the interpolated frame are then estimated based on the pixel characteristics of the associated pixel in the previous frame. In one embodiment, the estimated pixel characteristics of the pixel of the interpolated frame are equal to the pixel characteristics of the associated pixel in the previous frame.

Similarly, if the pixel is in an uncovering area, such as area 472 of the second interpolated frame 470 in FIG. 4, the pixel is associated with a corresponding pixel from the next frame 440 based on the reversed forward motion vector 445x passing through the area 472. The corresponding pixel with which the pixel is associated is selected by tracing the reversed forward motion vector 445x passing through the area 472 to its source and selecting a corresponding pixel from that location. The pixel characteristics of the pixel of the interpolated frame are then estimated based on the pixel characteristics of the associated pixel in the next frame. In one embodiment, the estimated pixel characteristics of the pixel of the interpolated frame are equal to the pixel characteristics of the associated pixel in the next frame.

If the pixel is in an area which is neither covered nor uncovered, the pixel is associated with a corresponding pixel from the previous frame and a corresponding pixel from the next frame based on a forward motion vector passing through the area containing the pixel and a reverse motion vector passing through the area containing the pixel. The pixel characteristics of the pixel of the interpolated frame are then estimated based on the pixel characteristics of the associated pixels in the previous and next frames. In one embodiment, the pixel characteristics are numerical values, and the estimated pixel characteristic is an average of the pixel characteristics of the associated pixels. In one embodiment, the average is a weighted average based on a temporal distance between the interpolated frame and the previous and next frame.

Figure 6:
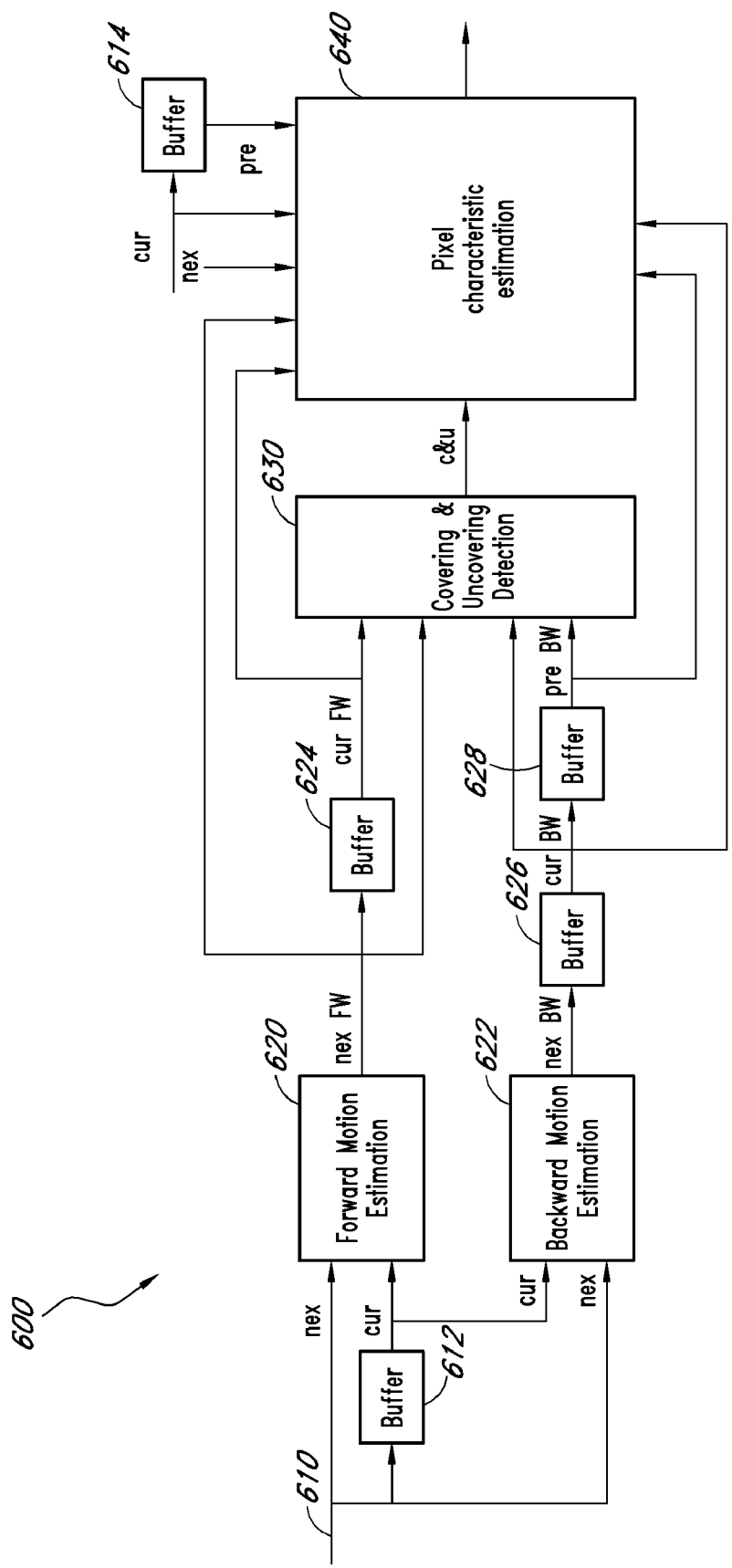
FIG. 6 is a functional block diagram of an exemplary system for implementing the method illustrated in FIG. 5.

The process 500 illustrated in FIG. 5 can be performed by any of a number of systems. One such system is illustrated in FIG. 6. Video is fed into the system 600 frame by frame at an input 610. A first frame fed into the system is stored in a first buffer 612. After a frame period, the first frame stored in the first buffer 612 is fed into a second buffer 614, and a second frame fed into the system 600 at input 610 is stored in the first buffer 612. After another frame period, the first frame stored in the second buffer 614 is designated the previous frame, the second frame stored in the first buffer 612 is designated the current frame, and a third frame fed into the system 600 at input 610 is designated the next frame.

The current frame stored in the first buffer 612 and the next frame at input 610 are both read by a forward motion estimation module 620 and a backward motion estimation module 622. The forward motion estimation module 620 estimates forward motion vector information, whereas the backward motion estimation module 622 estimates backward motion vector information. The forward motion vector estimation information is fed into a third buffer 624 and the backward motion estimation information is fed into a fourth buffer 626. In turn, the backward motion estimation information from the fourth buffer 626 is fed into a fifth buffer 628 when a new frame is received at the input 610. Storage of motion estimation data in the third, fourth, and fifth buffers results in motion estimation data from the current frame to the next frame (as shown in FIG. 4 with motion vectors 434 and labeled "nex FW" in FIG. 6), motion estimation data from the previous frame to the current frame (as shown in FIG. 4 with motion vector 423 and labeled "cur FW" in FIG. 6), motion estimation data from the next from the current frame (as shown in FIG. 4 with motion vector 432 and labeled "cur BW" in FIG. 6), and motion estimation data from the current frame to the previous frame (as shown in FIG. 4 with motion vector 421 and labeled "pre BW" in FIG. 6).

The four sets of motion estimation information (new FW, cur FW, cur BW, and pre BW) are fed from their respective buffers into a covering and uncovering (C&U) detection module 630. The C&U detection module 630 determines whether an area of an interpolated frame is a covering or uncovering area. The C&U detection module 630, in some embodiments, creates a map indicating those areas which are covering, those which are uncovering, and which are neither. The covering and uncovering information is fed into a pixel characteristic estimation module 640, which also receives the previous, current, and next frames, as well as the motion estimation data. The pixel characteristic estimation module 640 generates at least one interpolated frame.

In some embodiments, one or more of the elements of the system 600 of FIG. 6 can be rearranged and/or combined. The elements may be implemented by hardware, software, firmware, middleware, microcode or any combination thereof. For example, the input 610 can be an electrode or a wire. One or more of the buffers 612, 614, 624, 626, 628 can include a computer readable medium such as a volatile or non volatile memory such as a DRAM memory, flash memory, ROM memory, EPROM memory, EEPROM memory, registers, hard disk, a removable disk, a CD-ROM, or any other form of suitable storage medium known in the art. The modules, such as the forward motion estimation module 620, the backward estimation module 622, the C&U detection module 630, or the pixel characteristic estimation module 640 can be implemented by a processor, such as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 7:
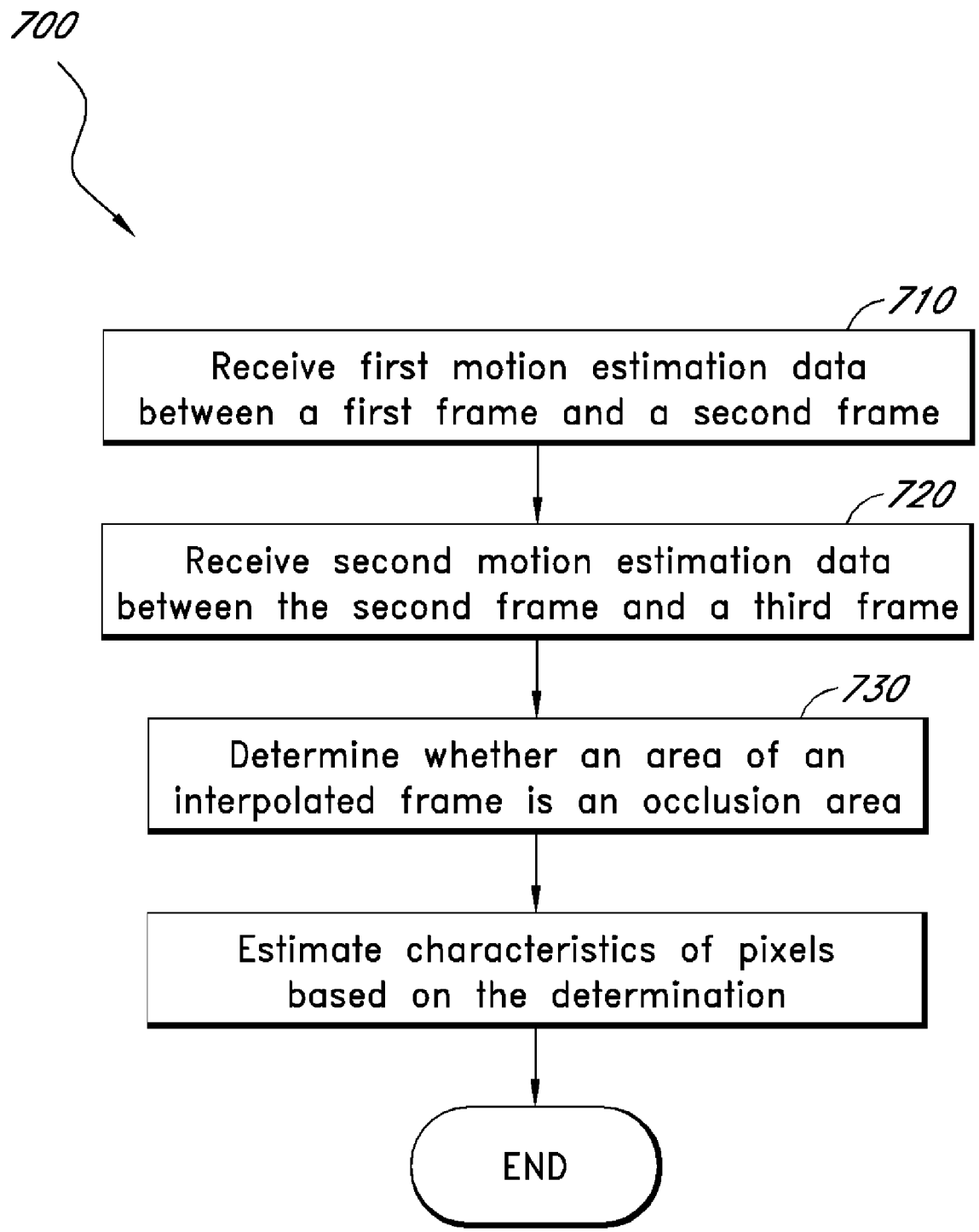
FIG. 7 is a flowchart illustrating a generalized method of interpolating a frame.

Detection of both covering and uncovering have been described above. Interpolation of a frame can be performed using covering detection, uncovering detection, or both. In general, covering detection and uncovering detection can be performed by a similar process by implementing the process in reverse. FIG. 7 is a flowchart illustrating a generalized method of interpolating a frame.

The process 700 begins at block 710 with the reception of first motion estimation data between a first frame and second frame. The reception can be performed by the video reception device 104 of FIG. 1. Alternatively, the reception can be performed by the C&U detection module 630 of FIG. 6. The process 700 continues, at block 720, with the reception of second motion estimation data between a second frame and a third frame. This reception can also be performed by the video reception device 104 of FIG. 1 or the C&U detection module 630 of FIG. 6. Although described and shown in FIG. 7 as being received in succession, the first and second motion estimation data can be received concurrently, or in reverse order.

In an embodiment corresponding with FIG. 4 for covering detection, the first frame of FIG. 7 corresponds with frame 430, the second frame corresponds with frame 420, and the third frame corresponds with frame 410. The first motion estimation data of FIG. 7 can include vector 432 and the second motion estimation data can include vector 421.

In an embodiment corresponding with FIG. 4 for uncovering detection, the first frame of FIG. 7 corresponds with frame 430, the second frame corresponds with frame 440, and the third frame corresponds with frame 450. The first motion estimation data of FIG. 7 can include vector 434 and the second motion estimation data can include vector 445.

In block 730 of FIG. 7, it is determined whether an area of an interpolated frame is an occlusion area. The determination can be performed by the reformatting subsystem 116 of FIG. 1, the occlusion classification subsystem 225 of FIG. 2, or the C&U detection module 630 of FIG. 6. In one embodiment, it is determined whether or not the area is a covering area. In another embodiment, it is determined whether or not the area is an uncovering area. In yet another embodiment, it is determined if the area is a covering area, an uncovering area, or neither.

The process 700 finishes in block 740 with the estimation of pixel characteristics based on the determination. The estimation can be performed by the reformatting subsystem 116 of FIG. 1, the reformatting subsystem 230 of FIG. 2, or the pixel characteristic estimation module 640 of FIG. 6. In one embodiment, the estimation is further based on at least one of the first, second, or third frame. In one embodiment, the pixel characteristics of each pixel in an interpolated frame are estimated resulting in a complete interpolated frame. In another embodiment, alternate rows of an interpolated frame are estimated resulting in an interpolated, interlaced frame.

While the above description has pointed out novel features of the development as applied to various embodiments, the skilled person will understand that various omissions, substitutions, and changes in the form and details of the device or process illustrated may be made without departing from the scope of the development. Therefore, the scope of the development is defined by the appended claims rather than by the foregoing description. Air variations coming within the meaning and range of equivalency of the claims are embraced within their scope.

What is claimed is:

1. A method of video frame interpolation comprising:
   receiving at least one of a first frame, a second frame, or a third frame;
   receiving first motion estimation data representing estimated motion of blocks between the first frame and the second frame;
   receiving second motion estimation data representing estimated motion of blocks between the second frame and the third frame;
   determining whether an area of an interpolated frame between the first and second frame will be an occlusion area based at least in part on the first and second motion estimation data;
   estimating characteristics of pixels of the area of the interpolated frame based in part on the determination wherein estimating the characteristics is based in part on pixel characteristics of pixels of the first frame or the second frame; and
   generating the interpolated frame based at least in part on the estimated pixel characteristics; and
   wherein:
   estimating the characteristics comprises:
   when it is determined the area is the occlusion area, estimating characteristics of pixels of the area based at least in part on pixel characteristics of pixels of a corresponding area of the second frame; and
   when it is determined the area is not the occlusion area, estimating characteristics of pixels of the area based at least in part on a weighted average of pixel characteristics of pixels of corresponding areas of the first and second frame.

2. The method of claim 1, wherein estimating characteristics comprises estimating at least one of an intensity value or a color value.

3. The method of claim 1, wherein the first frame is subsequent in time to the second frame which is subsequent in time to the third frame and wherein determining whether the area is the occlusion area comprises determining whether the area is a covered area.

4. The method of claim 1, wherein the first frame is prior in time to the second frame which is prior in time to the third frame and wherein determining whether the area is the occlusion area comprises determining whether the area is an uncovered area.

5. The method of claim 1, further comprising storing the interpolated frame.

6. The method of claim 1, further comprising outputting the interpolated frame to a video display device.

7. A method of video frame interpolation comprising:
receiving a video sequence comprising at least a first frame, a second frame, a third frame, and a fourth frame;
receiving first motion estimation data representing estimated motion between the second frame and the first frame;
receiving second motion estimation data representing estimated motion between the third frame and the second frame;
receiving third motion estimation data representing estimated motion between the second frame and the third frame;
receiving fourth motion estimation data representing estimated motion between the third frame and the fourth frame;
determining whether an area in an interpolated frame between the second frame and third frame will be a covering area;
determining whether the area in the interpolated frame between the second frame and third frame will be an uncovering area;
estimating characteristics of pixels of the area based in part on at least one of the determinations and at least one of the second or third frame; and
generating the interpolated frame based at least in part on the estimated pixel characteristics; and
wherein:
estimating the characteristics comprises:
when it is determined the area is the covering area, estimating characteristics of pixels of the area based at least in part on a corresponding area of the second frame;
when it is determined the area is the uncovering area, estimating characteristics of pixels of the area based at least in part on a corresponding area of the third frame; and
when it is determined the area is not the covering or the uncovering area, estimating characteristics of pixels of the area based at least in part on a weighted average of corresponding areas of the first and second frame.

8. The method of claim 7, further comprising storing or displaying a video sequence comprising, in order, at least the first frame, the second frame, the interpolated frame, the third frame, and the fourth frame.

9. A video frame interpolation system comprising:
an input configured to receive first motion estimation data representing estimated motion of blocks between a first frame and a second frame and to receive second motion estimation data representing estimated motion of blocks between the second frame and the third frame;
an occlusion determination module configured to determine whether an area in an interpolated frame between the first and second frame will be an occlusion area based at least in part on the first and second motion estimation data;
a pixel characteristic estimation module configured to estimate characteristics of pixels of the area of the interpolated frame based in part on the determination and estimating the characteristics is based in part on pixel characteristics of pixels of the first frame or the second frame; and
wherein:
when it is determined the area is the occlusion area, estimating the characteristics of pixels of the area based at least in part on pixel characteristics of pixels of a corresponding area of the second frame, and
when it is determined the area is not the occlusion area, the estimating characteristics of pixels of the area based at least in part on a weighted average of the pixel characteristics of pixels of corresponding areas of the first and second frame, and
a frame generator configured to generate the interpolated frame based at least in part on the estimated pixel characteristics.

10. The system of claim 9, further comprising an output configured to output the interpolated frame to a storage module or a display device.

11. A video frame interpolation system comprising:
an input configured to receive a video sequence from a computer-readable medium or over a network connection, the video sequence comprising at least a first frame, a second frame, a third frame, and a fourth frame; and
a processor configured to generate, to receive from a computer-readable medium, or to receive over a network connection, first motion estimation data representing estimated motion between the second frame and the first frame, second motion estimation data representing estimated motion between the third frame and the second frame, third motion estimation data representing estimated motion between the second frame and the third frame, and fourth motion estimation data representing estimated motion between the third frame and the fourth frame;
wherein the processor is further configured to determine whether an area in an interpolated frame between the second frame and third frame will be a covering area, an uncovering area, or neither,
wherein the processor is further configured to estimate characteristics of pixels of the area of the interpolated frame based in part on at least one of the determinations and at least one of the second or third frame and when it is determined the area is the covering area, estimating the characteristics of pixels of the area based at least in part on pixel characteristics of pixels of a corresponding area of the second frame, and when it is determined the area is the uncovering area, estimating the characteristics of pixels of the area based at least in part on a weighted average of the pixel characteristics of pixels of corresponding areas of the first and second frame, and
wherein the processor is further configured to generate an interpolated frame between the second frame and third frame based at least in part on the estimated pixel characteristics.

12. The system of claim 11, further comprising a memory configured to store a video sequence comprising, in order, at least the first frame, the second frame, the interpolated frame, the third frame, and the fourth frame.

13. The system of claim 11, further comprising an output configured to output to a display device a video sequence comprising, in order, at least the first frame, the second frame, the interpolated frame, and the fourth frame.

14. A video frame interpolation system comprising:
means for receiving first motion estimation data representing estimated motion of blocks between a first frame and a second frame;
means for receiving second motion estimation data representing estimated motion of blocks between the second frame and a third frame;
means for determining whether an area in an interpolated frame between the first and second frame will be an occlusion area based at least in part on the first and second motion estimation data;
means for estimating characteristics of pixels of the area of the interpolated frame based in part on the determination and estimating the characteristics is based in part on pixel characteristics of pixels of the first frame or the second frame; and
wherein:
when it is determined the area is the occlusion area, estimating the characteristics of pixels of the area based at least in part on pixel characteristics of pixels of a corresponding area of the second frame, and
when it is determined the area is not the occlusion area, estimating the characteristics of pixels of the area based at least in part on a weighted average of the pixel characteristics of pixels of corresponding areas of the first and second frame, and
means for generating the interpolated frame based at least in part on the estimated pixel characteristics.

15. A programmable storage device comprising code which, when executed, causes a processor to perform a method of video frame interpolation comprising:
receiving first motion estimation data representing estimated motion of blocks between a first frame and a second frame;
receiving second motion estimation data representing estimated motion of blocks between the second frame and a third frame;
determining whether an area in an interpolated frame between the first and second frame will be an occlusion area based at least in part on the first and second motion estimation data;
estimating characteristics of pixels of the area of the interpolated frame based in part on the determination and estimating the characteristics is based in part on pixel characteristics of pixels of the first frame or the second frame, and
wherein:
when it is determined the area is the occlusion area, estimating the characteristics of pixels of the area based at least in part on pixel characteristics of pixels of a corresponding area of the second frame, and
when it is determined the area is not the occlusion area, estimating the characteristics of pixels of the area based at least in part on a weighted average of the pixel characteristics of pixels of corresponding areas of the first and second frame; and
generating the interpolated frame based at least in part on the estimated pixel characteristics.

* * * * *